(12) United States Patent
Cookman et al.

(10) Patent No.: US 11,764,894 B2
(45) Date of Patent: Sep. 19, 2023

(54) UNSTABLE JAMMING SIGNAL DETECTION

(71) Applicant: QUALCOMM Incorporated, San Diego, CA (US)

(72) Inventors: Jordan Cookman, San Jose, CA (US); Daniel Carolin, San Diego, CA (US); Angelica Wong, Palo Alto, CA (US); Krishnaranjan Rao, Sunnyvale, CA (US); Liang Zhao, Saratoga, CA (US); Jeffrey Wong, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/412,308

(22) Filed: Aug. 26, 2021

(65) Prior Publication Data

US 2023/0063434 A1 Mar. 2, 2023

(51) Int. Cl.
*H04B 17/318* (2015.01)
*H04K 3/00* (2006.01)

(52) U.S. Cl.
CPC ............. *H04K 3/42* (2013.01); *H04B 17/318* (2015.01)

(58) Field of Classification Search
CPC ... H04K 3/28; H04K 3/44; H04K 3/42; H04B 17/318
See application file for complete search history.

(56) References Cited

U.S. PATENT DOCUMENTS

| 6,314,147 | B1 * | 11/2001 | Liang | H04B 7/0854 |
| | | | | 375/348 |
| 7,254,199 | B1 * | 8/2007 | Desloge | H04B 7/086 |
| | | | | 375/350 |
| 7,386,034 | B2 * | 6/2008 | Korpet | H04K 3/228 |
| | | | | 455/507 |
| 7,480,271 | B2 * | 1/2009 | Guo | H04W 72/541 |
| | | | | 370/329 |
| 7,852,964 | B2 * | 12/2010 | Rajappan | H04B 7/0413 |
| | | | | 375/147 |
| 9,160,577 | B2 * | 10/2015 | Sikri | H04L 25/03292 |
| 9,198,062 | B2 * | 11/2015 | Breuer | H04K 3/22 |
| 9,198,063 | B2 * | 11/2015 | Breuer | H04B 1/7103 |
| 9,344,125 | B2 * | 5/2016 | Kpodzo | H04B 1/10 |

(Continued)

FOREIGN PATENT DOCUMENTS

| EP | 2453582 A1 | 5/2012 |
| EP | 3026835 A1 | 6/2016 |

(Continued)

OTHER PUBLICATIONS

International Search Report and Written Opinion—PCT/US2022/036615—ISA/EPO—dated Nov. 18, 2022.

(Continued)

*Primary Examiner* — Hai V Nguyen
(74) *Attorney, Agent, or Firm* — QUALCOMM Incorporated

(57) ABSTRACT

A method for inhibiting jammed signal use includes: receiving a desired signal wirelessly at a receiver; receiving an undesired signal wirelessly at the receiver, the undesired signal varying in strength over time; and inhibiting measurement of the desired signal, or use of a measurement of the desired signal, based on a determination that the undesired signal is a jamming signal based on a variation of the undesired signal being indicative of jamming.

30 Claims, 9 Drawing Sheets

(56) References Cited

U.S. PATENT DOCUMENTS

| | | | |
|---|---|---|---|
| 9,444,502 B2* | 9/2016 | Kpodzo | H04B 1/109 |
| 9,748,987 B2* | 8/2017 | Kpodzo | H04B 17/318 |
| 11,032,022 B1* | 6/2021 | Sen | G06N 5/027 |
| 2005/0078739 A1* | 4/2005 | Korpet | H04K 3/228 |
| | | | 375/152 |
| 2007/0291866 A1* | 12/2007 | Rajappan | H04B 7/0854 |
| | | | 375/267 |
| 2010/0278227 A1* | 11/2010 | Sikri | H04L 25/03292 |
| | | | 375/348 |
| 2012/0094625 A1* | 4/2012 | Worley | H04W 12/122 |
| | | | 455/337 |
| 2012/0208567 A1* | 8/2012 | Mesecher | H04B 7/086 |
| | | | 455/456.5 |
| 2013/0215764 A1* | 8/2013 | Breuer | H04W 24/04 |
| | | | 370/242 |
| 2013/0215786 A1* | 8/2013 | Breuer | H04B 1/7097 |
| | | | 370/252 |
| 2013/0308732 A1* | 11/2013 | Kpodzo | H04K 3/20 |
| | | | 375/346 |
| 2013/0309975 A1* | 11/2013 | Kpodzo | H04B 17/336 |
| | | | 455/63.1 |
| 2014/0254648 A1* | 9/2014 | Van Nee | H04B 7/0413 |
| | | | 375/346 |
| 2016/0241354 A1* | 8/2016 | Kpodzo | H04L 43/16 |
| 2017/0297446 A1* | 10/2017 | Namba | B60L 53/305 |
| 2017/0311307 A1* | 10/2017 | Negus | H01Q 21/065 |
| 2017/0349057 A1* | 12/2017 | Namba | H04B 3/54 |
| 2017/0366294 A1* | 12/2017 | Breuer | H04W 24/02 |
| 2018/0279213 A1* | 9/2018 | Raghavan | H04W 72/0453 |
| 2019/0109387 A1* | 4/2019 | Samadi Taheri | H01Q 9/42 |
| 2021/0207910 A1* | 7/2021 | Deng | H04N 5/23203 |
| 2021/0314081 A1* | 10/2021 | Shattil | G06N 5/027 |
| 2021/0405213 A1* | 12/2021 | Tuck | G01S 19/49 |

FOREIGN PATENT DOCUMENTS

| | | | | |
|---|---|---|---|---|
| EP | 3800811 A1 * | 4/2021 | | |
| EP | 3800811 A1 | 4/2021 | | |
| EP | 3872520 A2 * | 9/2021 | | G06F 3/03545 |
| GB | 2585210 A * | 1/2021 | | H04B 1/1027 |
| WO | WO-2016098294 A1 * | 6/2016 | | B60L 11/1818 |

OTHER PUBLICATIONS

Li T., et al., "Robust Joint Interference Detection and Decoding for OFDM-Based Cognitive Radio Systems with Unknown Interference", IEEE Journal on Selected Areas in Communications, IEEE Service Center, Piscataway, US, vol. 25, No. 3, Apr. 2007, pp. 566-575, XP011177056, ISSN:0733-8716, DOI: 10.1109/JSAC. 2007.070407, Abstract, p. 566, left-hand column, line1—right-hand column, line32.

* cited by examiner

UNSTABLE JAMMING SIGNAL DETECTION

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Signals received by mobile devices, e.g., 5G signals, satellite vehicle signals, etc., may be jammed, degrading the usefulness of the received signals. Signals may be intentionally jammed, e.g., by an entity desiring to inhibit communications and/or or accurate positioning of mobile devices, and/or unintentionally jammed, e.g., by a signal repeater that retransmits a signal at a much higher power than the signal is received by the repeater and other devices in the area, or by a transmission by the mobile device that receives the signal, with the transmission inducing in-band or out-of-band jamming.

SUMMARY

In an embodiment, an apparatus includes: a receiver configured to receive one or more signals wirelessly; a memory; and a processor communicatively coupled to the receiver and the memory and configured to: receive, via the receiver, a desired signal; receive, via the receiver, an undesired signal that varies in strength over time; and inhibit measurement of the desired signal, or use of a measurement of the desired signal, based on a determination that the undesired signal is a jamming signal based on a variation of the undesired signal being indicative of jamming.

In an embodiment, a method for inhibiting jammed signal use includes: receiving a desired signal wirelessly at a receiver; receiving an undesired signal wirelessly at the receiver, the undesired signal varying in strength over time; and inhibiting measurement of the desired signal, or use of a measurement of the desired signal, based on a determination that the undesired signal is a jamming signal based on a variation of the undesired signal being indicative of jamming.

In an embodiment, an apparatus includes: means for receiving a desired signal wirelessly; means for receiving an undesired signal wirelessly, the undesired signal varying in strength over time; and means for inhibiting measurement of the desired signal, or use of a measurement of the desired signal, based on a determination that the undesired signal is a jamming signal based on a variation of the undesired signal being indicative of jamming.

In an embodiment, a non-transitory, processor-readable storage medium includes processor-readable instructions to cause a processor of an apparatus to: receive a desired signal wirelessly; receive an undesired signal wirelessly, the undesired signal varying in strength over time; and inhibit measurement of the desired signal, or use of a measurement of the desired signal, based on a determination that the undesired signal is a jamming signal based on a variation of the undesired signal being indicative of jamming.

DETAILED DESCRIPTION

Figure 1:
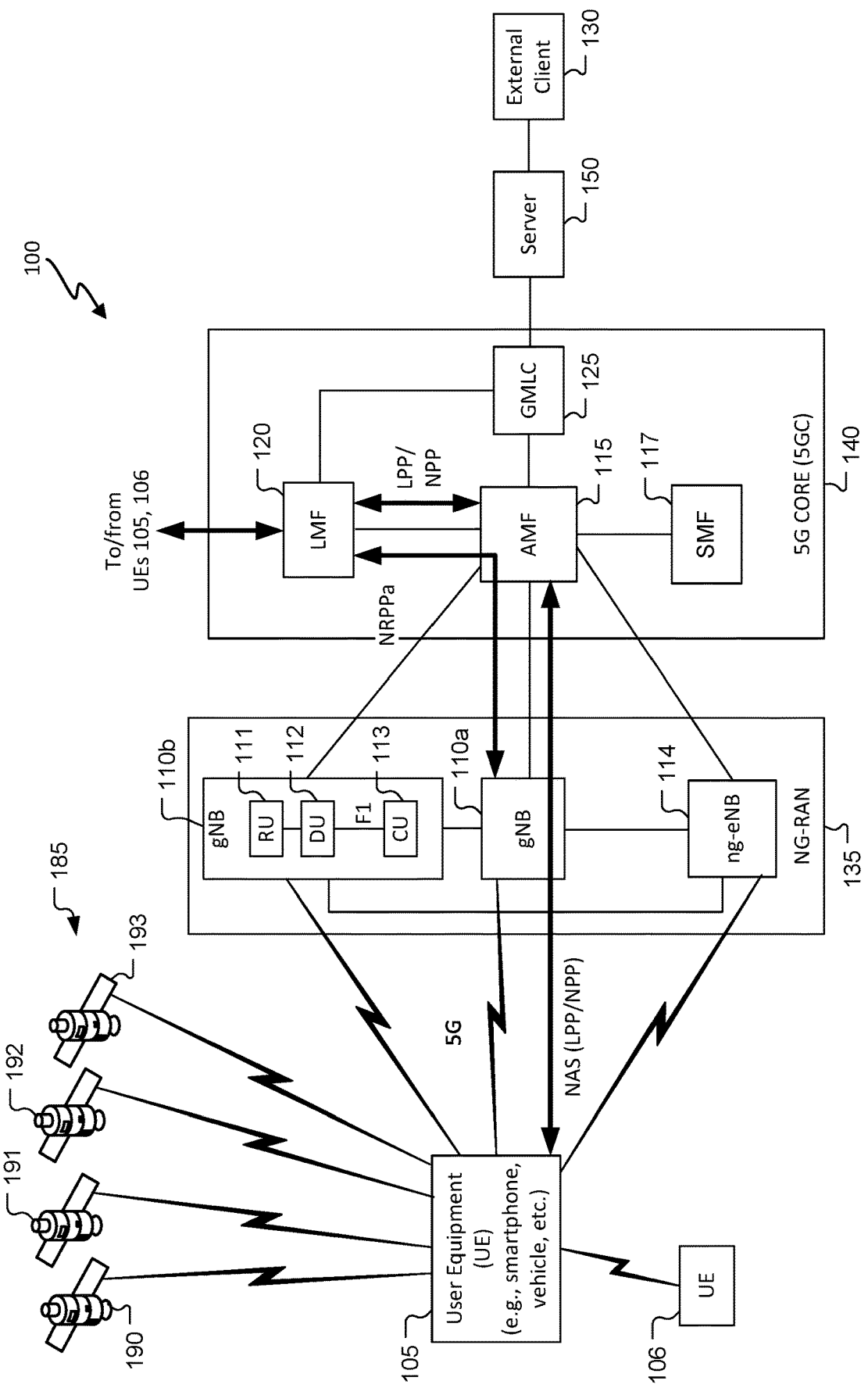
FIG. 1 is a simplified diagram of an example wireless communications system.

Techniques are discussed herein for detecting jamming of a signal and taking one or more actions based on detection of a jammed signal. For example, a signal strength of a received signal may be analyzed to determine whether the signal strength is indicative of the signal being a jamming signal. If the signal strength exceeds (e.g., on average over N samples) a signal-strength threshold, and the signal strength has significant variation over time, then the signal may be considered a jamming signal. In response to detecting a jamming signal, measurement of any signal that may be jammed by the jamming signal may be avoided (e.g., by turning off one or more components in a receive chain) to thus suppress the measurement, or use of a measurement of a signal that may be jammed may be inhibited, e.g., by flagging the measurement as unapproved or invalid.

Items and/or techniques described herein may provide one or more of the following capabilities, as well as other capabilities not mentioned. Negative consequences of using jammed signals (e.g., power consumption processing jammed signals, poor communication due to use of measurement of jammed communication signals, poor positioning accuracy and/or latency due to use of measurement of jammed positioning signals, etc.) may be avoided or reduced, e.g., by suppressing, ignoring, or de-weighting measurements of jammed signals. Jamming signals may be detected that previous techniques would not detect. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110*a*, 110*b*, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110*a*, 110*b* and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more BSs, e.g., one or more of the gNBs 110*a*, 110*b* and/or the ng-eNB 114 may be configured to communicate with the UE 105 via multiple carriers. Each of the gNBs 110*a*, 110*b* and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110*a*, 110*b*, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110*a*, 110*b*, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V21 (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b* and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110*a*, 110*b* and/or the ng-eNB 114 may include a radio unit (RU), a distributed unit (DU), and a central unit (CU). For example, the gNB 110*b* includes an RU 111, a DU 112, and a CU 113. The RU 111, DU 112, and CU 113 divide functionality of the gNB 110*a*. While the gNB 110*a* is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110a. The DU 112 hosts the Radio Link Control (RLC), Medium Access Control (MAC), and physical layers of the gNB 110a. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110a. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110a, 110b (e.g., via the RU 111, the DU 112, and the CU 113) and/or the ng-eNB 114, and/or the LMF 120. As another example, the UE 105, one or more of the gNBs 110a, 110b (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
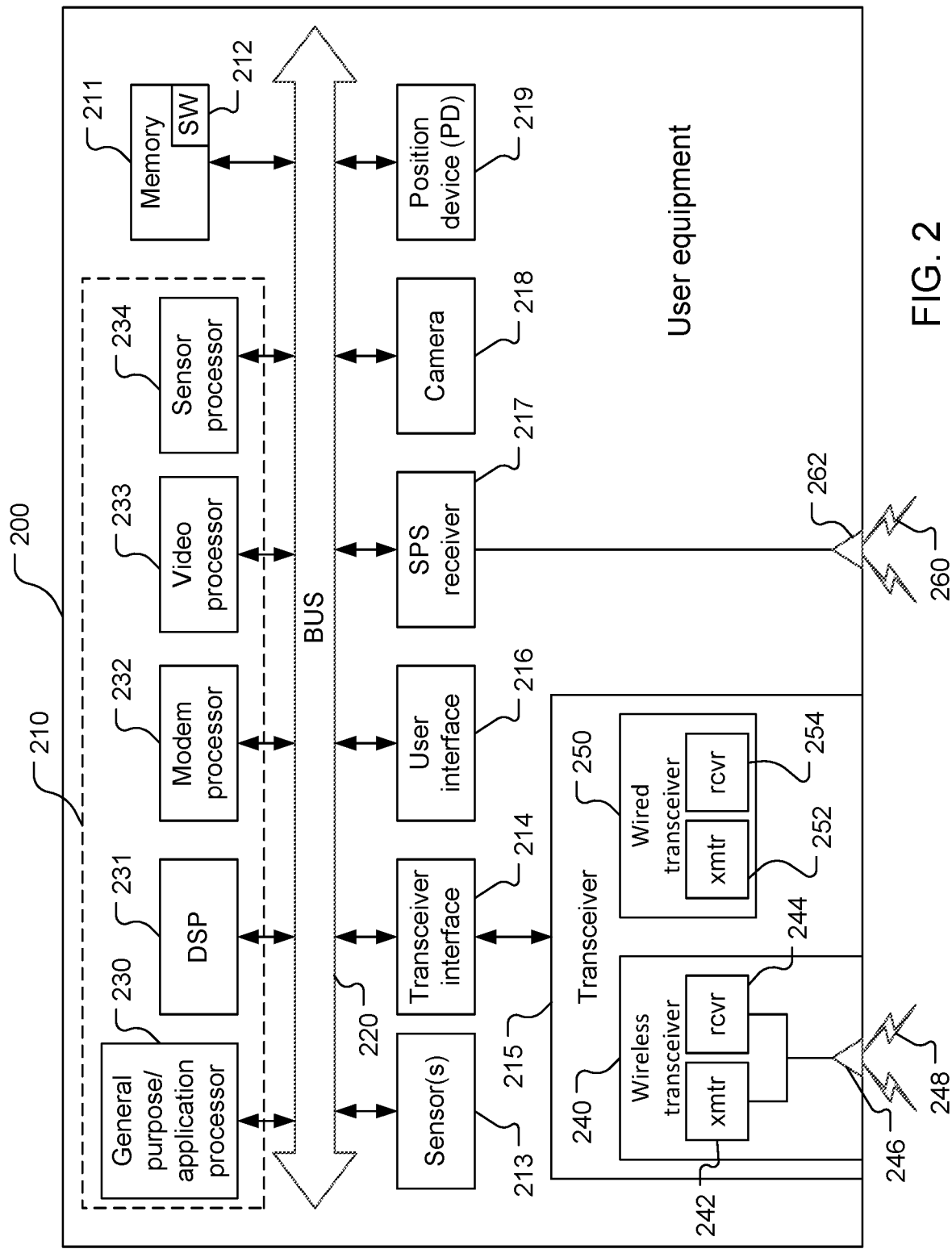
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
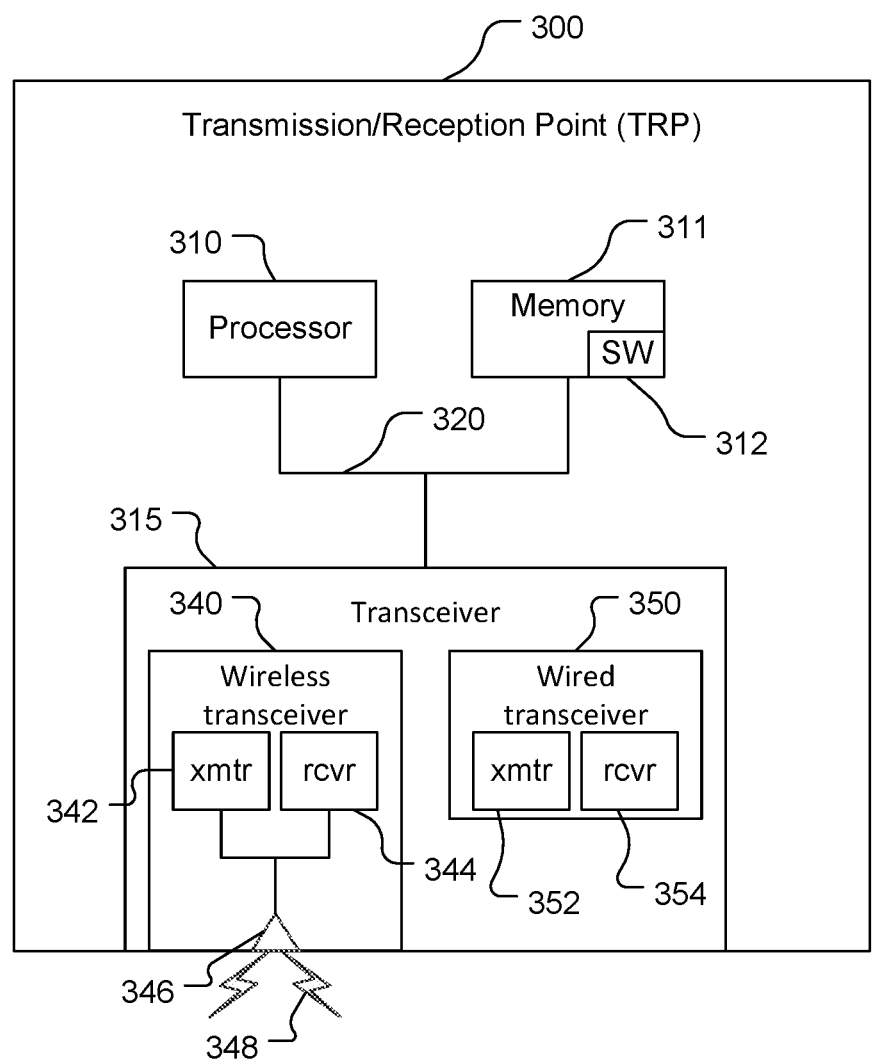
FIG. 3 is a block diagram of components of an example transmission/reception point shown in FIG. 1.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
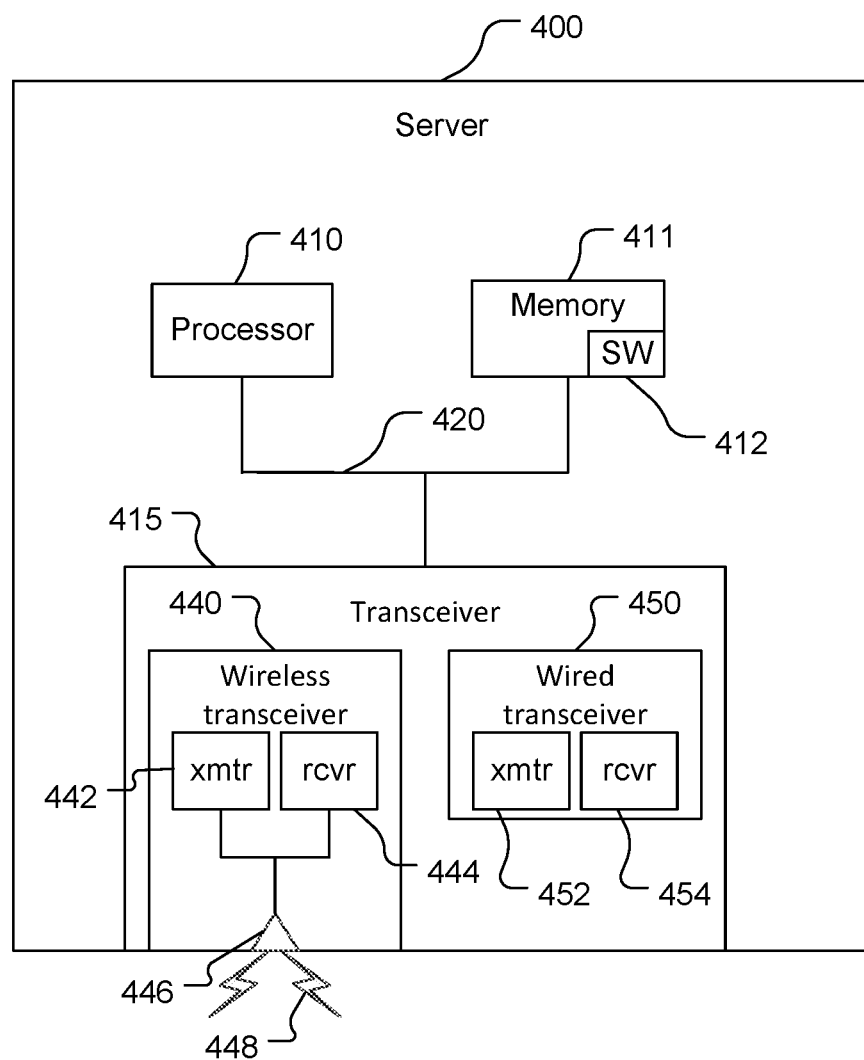
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Signal Jamming Detection and Responses Thereto

A UE may receive various types of signals, any one of which may be subject to intentional and/or unintentional jamming. A first signal (e.g., a positioning signal (satellite based or terrestrial based), a communication signal, etc.) is jammed by a second signal if the second signal interferes with measurement (e.g., impedes accurate measurement, e.g., for timing, decoding, etc.) of the first signal because the second signal is of enough power relative to the first signal when received to make measurement of the first signal unreliable. Determination that a received signal is likely to be a jamming signal may facilitate mitigation of effects of the jamming signal, e.g., trigger one or more actions to avoid using a jammed signal for positioning, for communication, etc.

Figure 5:
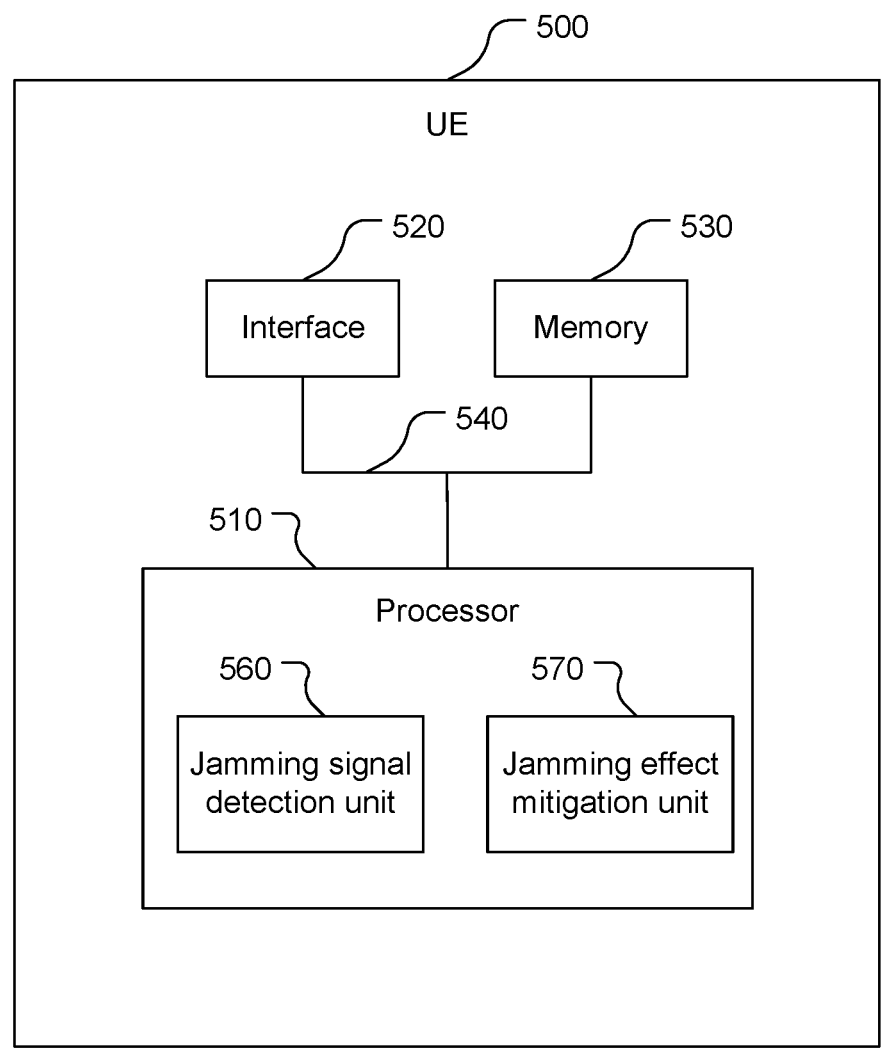
FIG. 5 is a block diagram of an example user equipment.

Referring to FIG. 5, with further reference to FIGS. 1-4, a UE 500 includes a processor 510, an interface 520, and a memory 530 communicatively coupled to each other by a bus 540. The UE 500 may include some or all of the components shown in FIG. 5, and may include one or more other components such as any of those shown in FIG. 2 such that the UE 200 may be an example of the UE 500. The processor 510 may include one or more components of the processor 210. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The interface 520 may include the SPS receiver 217 and the antenna 262. The memory 530 may be configured similarly to the memory 211, e.g., including software with processor-readable instructions configured to cause the processor 510 to perform functions.

The description herein may refer only to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the interface 520) includes a jamming signal detection unit 560 and a jamming effect mitigation unit 570. The jamming signal detection unit 560 is configured to determine whether a received signal is a jamming signal, e.g., by determining whether the received signal is unacceptably unstable. The jamming effect mitigation unit 570 may be configured to perform one or more functions for mitigating (e.g., reducing or avoiding) one or more effects of a jamming signal on operation of the UE 500, e.g., accurate signal measurement (e.g., of a positioning signal, a communication signal, etc.). For example, the jamming effect mitigation unit 570 may be configured to control activation status of different signal receive chains of the UE 500 for measuring signals. Signal receive chains may include RF paths (radio frequency paths) (e.g., components from an antenna to, but not including, an ADC) and one or more further components.

Figure 6:
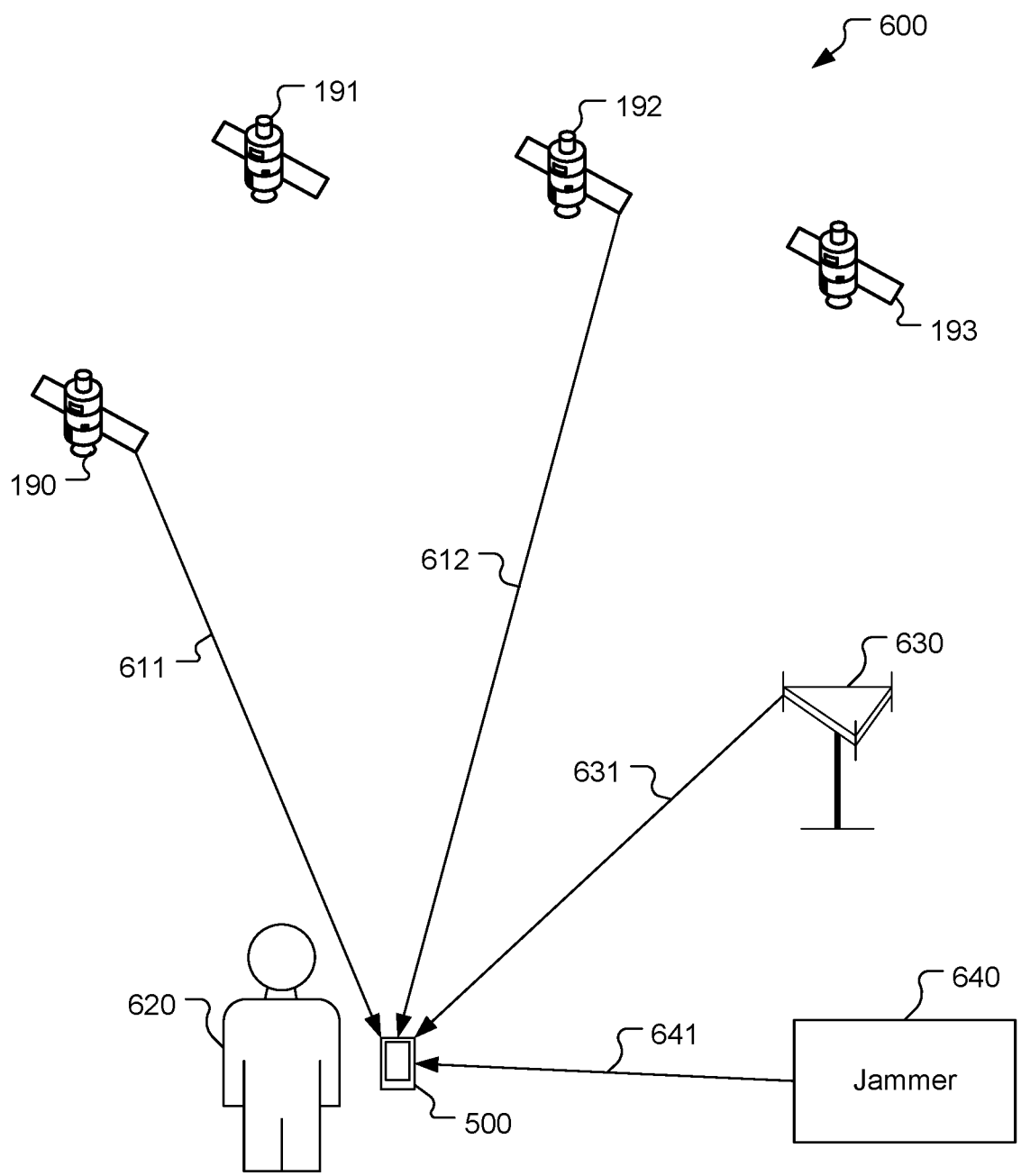
FIG. 6. is a simplified diagram of a navigation environment.

Referring also to FIG. 6, in a navigation environment 600, the UE 500 may be associated with (e.g., held by) a user 620 and may receive satellite signals 611, 612 from the satellites 190, 192, may receive a communication signal 631 from a base station 630, and may receive one or more other signals from one or more other sources, e.g., the satellites 191, 193, one or more other base stations, one or more other UEs, etc. The UE 500 also receives a jamming signal 641 from a jammer 640. The jammer 640 may produce the jamming signal 641 to intentionally jam one or more of the signals 611, 612, 631 or the jamming signal 641 may unintentionally jam one or more of the signals 611, 612, 631. For example, it has been found that terrestrial-based satellite signal repeaters may unintentionally jam satellite signals received by UEs. As another example, the jamming signal 641 may be a white noise signal, an intentional jamming signal, etc. Further, a jamming signal may be in-band with a signal that is jammed or out-of-band relative to the signal that is jammed. Strong out-of-band (OOB) jamming may result, for example, in an observed reduction in an in-band signal power metric due to gain compression effects in the receive chain.

Figure 7:
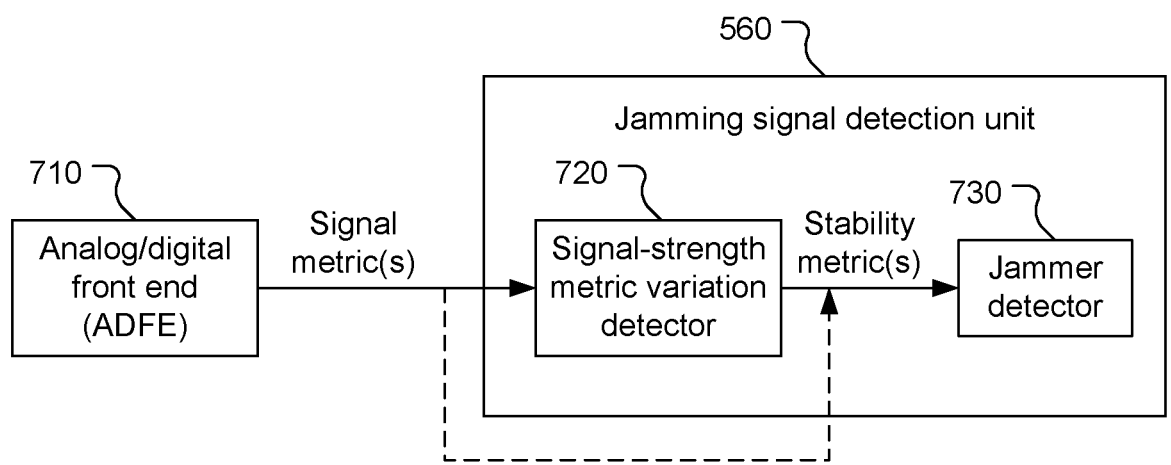
FIG. 7 is a block diagram of functional units for jamming detection.
Figure 8:
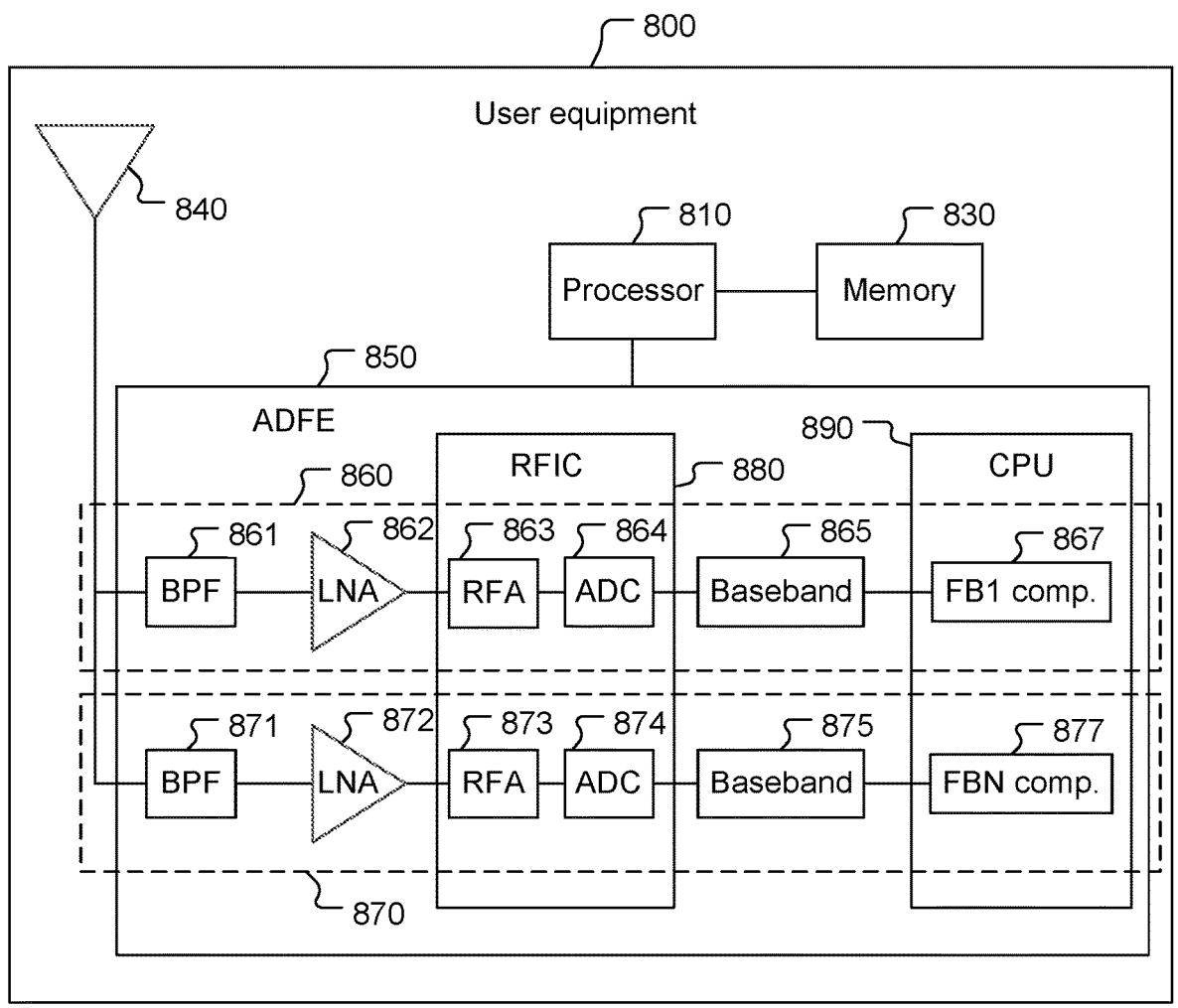
FIG. 8 is a block diagram of an example of the user equipment shown in FIG. 5.

Referring also to FIGS. 7 and 8, the jamming signal detection unit 560 of the UE 500 is configured to process one or more signal-strength metrics received from an analog/digital front end 710 to determine whether a corresponding signal is a jamming signal. The analog/digital front end 710 is configured to receive and process a signal to produce one or more signal-strength metrics and provide the signal-strength metric(s) to the jamming signal detection unit 560, in particular the signal-strength metric variation detector 720. The signal-strength metric(s) may also, in some configurations, be provided to the jammer detector 730. The signal-strength metric variation detector 720 is configured to measure a variation of the signal-strength metric(s), produce one or more variation metrics, and provide the variation metric(s) to the jammer detector 730. The jammer detector 730 is configured to use one or more of the variation metric(s) and/or one or more of the signal-strength metric(s), to determine whether a signal corresponding to the signal-strength metric(s) and the variation metric(s) is a jamming signal and to provide an indication of jamming in response determining that the signal corresponding to the signal-strength metric(s) and the variation metric(s) is a jamming signal.

Referring also to FIG. 8, a UE 800, which is an example of the UE 500, includes a processor 810, a memory 830, an antenna 840, and an analog/digital front end 850 communicatively coupled to each other. The processor 810 is an example of the processor 510 and the memory 830 is an example of the memory 530. The processor 810 and is configured to control components of the analog/digital front end 850, e.g., activation status (whether a component (including a portion of a component) is active (e.g., powered or enabled for operation) or inactive (e.g., unpowered or disabled from operation)). The antenna 840 comprises one or more antennas and is configured to receive one or more types of signals, e.g., satellite signals, terrestrial-based communication signals, terrestrial-based positioning signals (e.g., Positioning Reference Signals (PRS)), etc. The analog/digital front end 850 in this example is configured to receive signals of different frequency bands, and process the different signals in different receive chains 860, 870.

The analog/digital front end 850 includes the multiple receive chains 860, 870, e.g., for measuring satellite signals of different frequency bands. While two receive chains are shown in FIG. 8, the UE 800 may include more than two receive chains, e.g., for measuring signals having frequencies in more than two different frequency bands (e.g., different sub-bands). The receive chains 860, 870 may, for example, be configured to measure satellite signals in the L1 and L2/L5 bands, respectively, although this is an example and not limiting of the disclosure as the measurement either or both of the receive chains 860, 870 may be configured to measure signals of other frequency bands, and/or other receive chains may be included in the UE 800.

The receive chains 860, 870 include respective components for measuring signals of different frequency bands. The receive chain 860 includes a BPF 861 (bandpass filter), an LNA 862 (low-noise amplifier), an RFA 863 (radio frequency/analog processing block) for down-conversion, signal conditioning/filtering, and amplification), an ADC 864 (analog-to-digital converter), a baseband block 865, and a computational block 867. The RFA 863 RFA 863 may be referred to as a programmable gain amplifier (PGA). The BPF 861 is configured to pass signals of frequencies within a desired frequency band, e.g., the L1 band, with little if any attenuation, and to significantly attenuate signals of frequencies outside the desired frequency band of the BPF 861. The LNA 862 is configured to amplify signals passed by the BPF 861. The RFA 863 RFA 863 is configured to down convert the analog amplified signals output by the LNA 862 to a baseband frequency, to perform signal conditioning and/or filtering (e.g., anti-aliasing filtering), and amplification in addition to the amplification by the LNA 862. The ADC 864, which here is a portion of an RFIC 880 (Radio Frequency Integrated Circuit), is configured to convert the analog signals output by the RFA 863 into digital signals. The baseband block 865 is configured to perform signal processing of the digital signals output by the ADC 864, e.g., correlating the digital signals output by the ADC 864 with respective reference pseudorandom signals (e.g., Gold codes) by integrating the signals (e.g., for 1 ms) and dumping the integrated signals for further processing to determine whether the correlation results have sufficient energy to indicate a true signal. The computational block 867, which here is a portion of a CPU 890 (Central Processing Unit), may configured to perform one or more computations on the signals output by the baseband block 865 to determine one or more measurements (e.g., of signal strength (e.g., signal amplitude or signal power), etc.). The computational block 867 comprises a portion of the CPU 890 for performing measurement computations for the receive chain 860, namely corresponding to signals in the desired frequency band of the BPF 861. Thus, the computational block 867 is shown as being for computation for frequency band 1 (FB1). The CPU 890 may be a portion of the processor 510. The receive chain 870 includes a BPF 871, an LNA 872, a RFA 873, an ADC 874, a baseband block 875, and a computational block 877. The BPF 871 is configured to pass signals of frequencies within a desired frequency band, e.g., the L2/L5 band, with little if any attenuation, and to significantly attenuate signals of frequencies outside the desired frequency band of the BPF 871. The LNA 872, RFA 873, ADC 874, baseband block 875, and computational block 877 are configured similarly to the LNA 862, RFA 863, ADC 864, baseband block 865, and computational block 867, but configured, as appropriate, for processing signals corresponding to signals of the desired frequency of the BPF 871. Thus, the computational block 877 is shown as being for computation for frequency band N (FBN), as there may be N receive chains, with N being an integer of two or greater.

The receive chains 860, 870 are distinct and may be activated/deactivated by the processor 810 independently, e.g., one or more respective components of one or both of the receive chains 860, 870 being powered off to deactivate the corresponding receive chain 860, 870. Although the RFAs 863, 873 and the ADCs 864, 874 are parts of the RFIC 880, the RFA 863 and the ADC 864 comprise a portion of the RFIC 880 and the RFA 873 and the ADC 874 comprise a different portion of the RFIC 880, e.g., such that the RFA 863 and the ADC 864 may be enabled/disabled independently of enablement/disablement of the RFA 873 and the ADC 874. Similarly, the computational block 867 comprises a portion of the CPU 890 and the computational block 877 comprises a different portion of the CPU 890 such that the computational blocks 867, 877 may be enabled/disabled independently. For example, processing by the computational block 867 may be performed while processing by the computational block 877 may be avoided, thus saving power that would be used to perform computations by the computational block 877. Each of the receive chains 860, 870 may be controlled by the processor 810 to be active, e.g., with the BPF 861, the LNA 862, the RFA 863, the ADC 864, the baseband block 865, and the computational block 867 powered and/or with the BPF 871, the LNA 872, the RFA 873, the ADC 874, the baseband block 875, and the computational block 877 powered. Similarly, each of the receive chains 860, 870 may be controlled by the processor 810 to be inactive, e.g., with one or more of the BPF 861, the LNA 862, the RFA 863, the ADC 864, the baseband block 865, and the computational block 867 not powered or otherwise not used (e.g., the computational block 867 not provided with data to process) and/or with one or more of the BPF 871, the LNA 872, the RFA 873, the ADC 874, the baseband block 875, and the computational block 877 not powered or otherwise not used.

The computational blocks 867, 877 are configured to determine one or more signal-strength metrics as a function of signal strength (e.g., signal amplitude and/or signal power) of received signals. Signal strength of a received signal may be measured at a desired point in the receive chain 860 (and/or the receive chain 870). For example, signal amplitude may be output by the ADC 864, and gain of the RFA 863 may be determined and/or gain of the baseband block 865 determined, and output signal power of the baseband block 865 may be determined, with the overall baseband signal power metric based on the baseband output power, the RFA gain, and the gain of the baseband block. Known gains that are applied to the signal before the measurement may be subtracted, such that the signal-strength metric is given by $$S_{metric}=10\ \log_{10}(\text{Signal power})-\text{Total gain} \quad (1)$$

where $S_{metric}$ is the signal-strength metric, and the total gain is in units of dB. If all gains are known and removed, then the signal-strength metric represents an absolute signal strength. If there is one or more unknown gains, then the signal-strength metric represents a relative signal strength, and a Reference Noise Level (RNL) may be used for comparison. The RNL represents the expected signal strength when no jamming signal is present. The analog/digital front end 850 (e.g., one or both of the computational block 867, 877 (and/or one or more of any other computational blocks)) may provide the signal-strength metric(s) to the processor 810, in particular the jamming signal detection unit 560.

Referring in particular again to FIG. 7, the signal-strength metric variation detector 720 is configured to measure variation of a signal-strength metric over time. Any of various options for measuring signal-strength metric variation may be used. For example, a standard deviation of N consecutive signal-strength metric observations may be determined as a variation metric, that is $$V_{metric}(N)=std(S_{metric}(1:N)) \quad (2)$$

where $V_{metric}(N)$ is the present variation metric (corresponding to observation N), and $S_{metric}(1:N)$ is the set of signal-strength metrics for the N most recent observations. Various values of N may be used, such as 10 or 30 for ADC amplitude and baseband output signal power. Consecutive observations may be separated in time by, for example, one second. As another example, a variation metric may be a range of signal-strength metric values over the N observations, that is $$V_{metric}(N)=\max(S_{metric}(1:N))-\min(S_{metric}(1:N)) \quad (3)$$

As another example, a variation metric may be a maximum absolute difference between a current observation and previous observations, e.g., N−1 previous measurements, such that $$V_{metric}(N)=\max(abs(S_{metric}(N)-S_{metric}(1:N-1))) \quad (4)$$

These are examples, and other ways of determining a signal-strength metric may be used that have the variation metric be responsive to (have the variation metric value depend on) variation in the signal-strength metric over time.

The jammer detector 730 may determine whether a signal is a jamming signal by evaluating one or more one or more variation metrics received from the signal-strength metric variation detector 720 and/or one or more signal-strength metrics, e.g., received from the analog/digital front end 710. For example, the jammer detector 730 may determine that a signal corresponding to a variation metric is a jamming signal based solely on the variation metric. A signal may be deemed a jamming signal if, for example, the variation metric corresponding to the signal indicates that the variation of the signal is unacceptably high, e.g., the stability metric exceeds a stability threshold, indicating that the signal is unacceptably unstable (e.g., the stability of the signal is unacceptably low or the instability of the signal is unacceptably high). For example, the jammer detector 730 may be configured that if the variation metric indicates an amount of variation of the signal-strength metric, with higher values of variation metric corresponding to higher levels of variation, then the jammer detector 730 detects a jamming signal as follows $$\text{If } V_{metric}>V_{thresh}, \text{then } set \text{ Jammer Indicator positive} \quad (5)$$

where $V_{thresh}$ is a variation threshold, and the jammer indicator being positive indicates that a signal is a jamming signal. The variation threshold may be a variation rate, e.g., a variation amount per amount of time or variation amount per number of observations. As another example, the jammer detector 730 may be configured to determine that a signal is a jamming signal based on either the variation metric for the signal or the signal-strength metric for the signal. A signal may be deemed a jamming signal if, for example, the variation metric corresponding to the signal indicates that the variation of the signal is unacceptably high or the signal-strength metric of the signal indicates that the signal strength is high enough for the signal to be considered to be a jamming signal, e.g., being unlikely not to be a jamming signal. In this case, the jammer detector 730 may be configured to detect a jamming signal as follows $$\text{If }(V_{metric}>V_{thresh}\text{ OR } S_{metric}>S_{thresh}), \text{then } set \text{ Jammer Indicator positive} \quad (6)$$

where $S_{thresh}$ is a signal-strength threshold. As another example, the jammer detector 730 may be configured to determine that a signal is a jamming signal based on a combination of the variation metric for the signal and the signal-strength metric for the signal. For example, the jammer detector may be configured to detect a jamming signal according to $$\text{If (any of } S_{metric}(1:N-1)S_{thresh} \text{ AND } V_{metric}>V_{thresh}), \text{then } set \text{ Jammer Indicator positive} \quad (7)$$

In this way, the variation metric provides hysteresis to the jamming signal detection. In this configuration, once the jammer detector 730 detects that the variation metric exceeds the variation threshold, then the jammer indicator will continue to be set to positive for as long as the variation metric continues to exceed the variation threshold and the signal strength of at least one of the previous N−1 observations exceeds the signal-strength threshold. That is, the jammer detector 730 will continue to determine that a received signal is a jamming signal as long as any recent signal strength exceeded the signal-strength threshold and the variation metric indicates unacceptable variation of the signal. The jammer detector 730 will thus continue to indicate jamming once jamming is detected as long as the signal has unacceptable variation over a prior amount of time or observations such that the conclusion of jamming is not removed immediately upon the signal strength dropping below a signal-strength threshold. This may help avoid measuring a jammed signal and/or using a measurement of a jammed signal that would have been considered not to be jammed using previous techniques.

Evaluations other than any of if-then logic (5)-(7) may be used to detect a jamming signal. For example, the jammer detector 730 may be configured to determine that a signal is a jamming signal based on the if-then logic (7) or a present signal strength exceeding the signal-strength threshold as follows If $(S_{metric}(N) > S_{thresh}$ OR(any of $S_{metric}(1:N-1) > S_{thresh}$ AND $V_{metric} > V_{thresh}))$, then set Jammer Indicator positive (8)

Still other evaluations are possible for detecting a jamming signal.

The signal-strength metric variation detector 720 may be configured to determine the signal-strength threshold. For example, the signal-strength threshold may be set to the RNL plus a constant representing a level of degradation in receiver performance that is desired to be considered as jammed and thus to trigger setting of the jamming indicator to positive. Thus, for example, the signal-strength metric variation detector 720 may be configured to determine the signal-strength threshold as $$S_{thresh} = RNL + C \quad (10)$$

where C is a constant and may be set to a value, e.g., 10 dB, based on desired performance degradation to be considered jamming. For receivers that support operation on multiple frequency bands (e.g., the receive chains 860, 870 of the UE 800), the signal-strength threshold for one frequency band may be set dynamically based on the signal-strength indicator for another frequency band. For example, the signal-strength threshold for a first frequency band ($S_{thres1}$) may be set dynamically based on the signal-strength metric for a second frequency band ($S_{metric2}$). The signal-strength threshold for the first frequency band may be determined according to $$S_{thres1} = RNL_1 + C + (S_{metric2} - RNL_2) \quad (11)$$

where $RNL_1$ is the reference noise level for the first frequency band and $RNL_2$ is the reference noise level for the second frequency band. Setting the signal-strength threshold for the first frequency band based on the signal-strength metric of the second frequency band helps prevent switching from a first jammed frequency band to a second jammed frequency band that is being jammed as much as, or more than, the first jammed frequency band. When setting the signal-strength threshold of one band based on the signal strength metric of another band, the signal-strength metric variation detector 720 may be configured to apply a floor (lowest possible value) to a determined signal-strength threshold. The floor may help prevent the signal-strength metric of the second band from causing the signal-strength threshold for the first band to decrease below what the signal-strength threshold for the first band would be without considering the signal-strength metric for the second band. Thus, for example, the signal-strength metric variation detector 720 may be configured to determine the signal-strength threshold according to $$S_{thres1} = RNL_1 + C + \max(0, S_{metric2} - RNL_2) \quad (12)$$

The jamming effect mitigation unit 570 may be configured to respond to a determination that a jamming signal is present (e.g., the jamming indicator being set to positive) by taking one or more actions. For example, the jamming effect mitigation unit 570 may be configured to deprecate one or more outputs corresponding to a signal that has been determined to be jammed (e.g., in-band with a jamming signal, affected by OOB jamming, etc.). The jamming effect mitigation unit 570 may, for example, provide an indication of some level of disapproval and/or warning regarding an output corresponding to a possibly-jammed signal, e.g., a pseudorange, a signal timing, a signal amplitude, and/or a position estimate derived from a possibly-jammed signal. The indication may indicate, for example, disapproval, absence of approval, and/or discouragement of use of the output. A recipient of the output and the deprecation indication may decide whether to use the output. For example, a positioning entity may use a deprecated measurement if the positioning entity has insufficient measurements to determine a position estimate without the deprecated measurement, and disregard the deprecated measurement if the positioning entity has a sufficient quantity of non-deprecated measurements to determine the position estimate. As another example, a positioning entity may de-weight a deprecated measurement to determine a position estimate. As another example, a recipient of a deprecated measurement may trigger spoofing detection. The deprecation indication may help prevent poor positioning accuracy due to use of a jammed signal, and may help a position estimate (though possibly less accurate than desired) to be determined when that position estimate would not be determined if an output was suppressed instead of deprecated.

Also or alternatively, the jamming effect mitigation unit 570 may be configured to respond to a determination that a jamming signal is present by taking one or more other actions. For example, the jamming effect mitigation unit 570 may be configured to respond to a determination that a jamming signal is present by suppressing one or more outputs corresponding to a signal that has been determined to be jammed such that the one or more outputs are prevented from reaching a recipient and being used by the recipient. This may help ensure good positioning accuracy. As another example, the jamming effect mitigation unit 570 may be configured to invalidate one or more outputs corresponding to a signal that has been determined to be jammed. The jamming effect mitigation unit 570 may provide an invalid indication along with the one or more outputs. This may help prevent use of inaccurate measurements and thus improve positioning accuracy, and may provide information that may be used for other purposes (e.g., to trigger spoofing detection). As another example, the jamming effect mitigation unit 570 may shift resources from a jammed frequency band to another frequency band that is not jammed, or at least jammed less than the jammed frequency band. For example, the jamming effect mitigation unit 570 may power down one or more components (e.g., the LNA 862, the RFA 863, the computational block 867, etc.) of the receive chain 860 based on the frequency band of the receive chain 860 being jammed and powering on the receive chain 870. This may help conserve power while maintaining or improving positioning accuracy. The jamming effect mitigation unit 570 may also occasionally (e.g., periodically) power on one or more components of the receive chain 860 for some time to allow for updating of the jamming status.

Deprecation and/or invalidation indications for the output(s) associated with jamming may be aggregated and distributed. Thus, jamming and lack of jamming may be crowd sourced, e.g., with a map of regions of jamming/spoofing and regions lacking jamming/spoofing provided to devices for use in determining whether to take one or more actions such as whether to make one or more measurements, whether to take one or more precautions (e.g., ignoring signals), whether to report one or more measurements, etc.

The reference noise level (RNL) is used to compensate for unknown gain in the signal-strength metric. The RNL may vary from device to device, e.g., due to part-to-part differences and/or differences in manufacture, and may vary over time, e.g., due to component aging. The RNL may be set in any of various manners. For example, an RNL value may be determined based on a device design, and possibly using one or more device measurements (e.g., an average of measurements using a sample of the devices) and statically configured, e.g., programmed into the memory 530 during manufacture. As another example, each device during manufacture may be tested to determine an RNL for that device, and this RNL statically configured, e.g., programmed into the memory 530 during manufacture.

As another example of RNL calibration, the RNL may be dynamically configured, e.g., by the UE 500 during use, with the RNL being updated as appropriate. For example, the jamming signal detection unit 560 may be configured to measure the signal-strength metric intermittently, e.g., at a beginning of each session at the UE 500, e.g., each communication session or each positioning session. The jamming signal detection unit 560 may be configured to set the RNL to the signal-strength metric determined at the beginning of each session. As another example, the jamming signal detection unit 560 may be configured to dynamically calibrate the RNL during operation of the UE 500. For example, the jamming signal detection unit 560 may be configured to replace an RNL value (which becomes an old RNL value RNL old) with a new RNL value $RNL_{new}$ based on a presently-measured signal metric, e.g., the old RNL value plus a difference of the presently-measured signal-strength metric and the old RNL value according to $$RNL_{new}=RNL_{old}+(S_{metric}-RNL_{old}) \quad (13)$$

The jamming signal detection unit 560 may retain the calibrated RNL value across sessions, e.g., storing the most-recent calibrated RNL value in the memory 530 before the end of a session (e.g., each time the RNL is determined) and retrieving the stored RNL value from the memory 530 at the beginning of a new session. Before the first receiver session of the UE 500, an initial RNL value may be statically configured as discussed above (e.g., set based on design of the UE 500 or measured and set during manufacture of the UE 500). The jamming signal detection unit 560 may calibrate RNLs for different frequency bands independently.

The jamming signal detection unit 560 may be configured to help avoid poor or mis-calibration of the RNL. For example, the jamming signal detection unit 560 may be configured to help avoid calibration of the RNL for a frequency band while that frequency band is being jammed at the UE 500. The jamming signal detection unit 560 may, for example, be configured not to calibrate the RNL for a frequency band while the jammer indicator for that frequency band is set (i.e., to positive). As another example, the jamming signal detection unit 560 may be configured to limit calibration of the RNL to when a receiver performance meets or exceeds desired performance, e.g., as indicated by one or more performance metrics at least meeting one or more performance metric thresholds, or a combination of metrics meeting combination criteria. For example, calibration may be limited to times when a bit error rate (BER) is below a threshold error rate, or an SNR (signal-to-noise ratio) is above an SNR threshold, or an estimated position error (e.g., for a GNSS receiver) such as HEPE (horizontal estimated position error) being below a threshold position error. For combinations of metrics, one or more of the metrics may not meet a threshold for individual determination of performance, but a combination of metric values meet a combination of threshold values (e.g., an SNR threshold for evaluation of SNR only may be higher than an SNR threshold when evaluating SNR and bit error rate to determine acceptable performance).

To calibrate the RNL, the jamming signal detection unit 560 may be configured to adjust an old value (previous value) of the RNL to a new value (present value) of the RNL by different amounts (resulting in faster or slower adjustment of the RNL) depending on whether the new value of the RNL will be higher or lower than the old value of the RNL. Because the true RNL should be the lowest signal level that a receiver observes, the jamming signal detection unit 560 may adjust the RNL faster when the RNL is decreasing rather than when the RNL is increasing. If the RNL is increasing, a corresponding desired signal may be getting jammed, and thus slowly increasing the RNL helps prevent raising the RNL so much that a jammed signal appears not to be jammed, and gets used by the receiver, e.g., the UE 500. An example of calibration filtering logic can be represented by If $S_{metric}>RNL_{old}$, then $RNL_{new}=RNL_{old}+(S_{metric}-RNL_{old})/RNL_{coef1}$ Else $RNL_{new}=RNL_{old}+(S_{metric}-RNL_{old})/RNL_{coef2}$ where $RNL_{coef1}>RNL_{coef2}$ such that $(RNL_{old}+(S_{metric}-RNL_{old})/RNL_{coef1})<(RNL_{new}=RNL_{old}+(S_{metric}-RNL_{old})/RNL_{coef2})$ (14)

Thus, if $S_{metric}>RNL_{old}$, then the $RNL_{old}$ is incremented more (by a greater amount) to become $RNL_{new}$ than if $S_{metric}<RNL_{old}$.

The jamming signal detection unit 560 may be configured to consider whether out-of-band (OOB) jamming is present when determining at what rate (e.g., by what incremental amount) to adjust RNL for calibration. Jamming may occur relative to a frequency that is OOB of a desired signal to be measured (e.g., a PRS), but that is in-band of the circuitry (e.g., the receive chain 860 or the receive chain 870, e.g., the ADC 864 or the AND 874) used to detect the desired signal. The OOB jamming may cause gain compression such that a perceived gain of the desired signal is lower in the presence of the OOB jamming. Automatic gain control by an RFA may cause the signal metric level to go below the true RNL, which may cause a dynamically determined RNL value to be lower than desired unless the jamming signal detection unit 560 guards against the RNL value going lower than desired. To detect OOB jamming, an implied signal power component of the RNL may be compared to a threshold such that If (RNL+Total gain<Signal power threshold), then OOB jammer is detected Because OOB jamming causes the RNL to be artificially low, the jamming signal detection unit 560 may be configured to adjust old RNL value by a greater amount of OOB jamming is detected than if the RNL is increasing and OOB jamming is not detected. For example, the jamming signal detection unit 560 may implement RNL calibration logic as follows If $S_{metric}>RNL_{old}$ AND OOB jammer not detected,
then $RNL_{new}=RNL_{old}+(S_{metric}-RNL_{old})/RNL_{coef1}$ Else $RNL_{new}=RNL_{old}+(S_{metric}-RNL_{old})/RNL_{coef2}$ (15)

where $RNL_{coef1}>RNL_{coef2}$.

Figure 9:
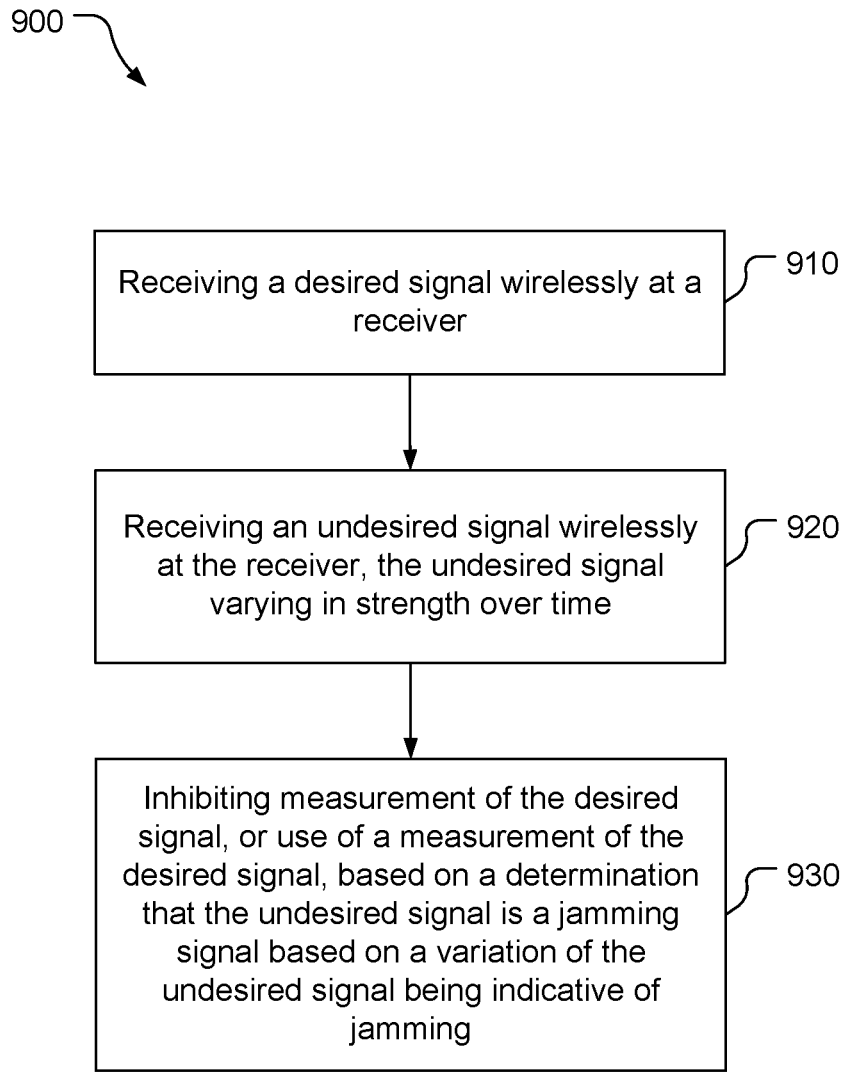
FIG. 9 is a block flow diagram of a method for inhibiting jammed signal use.

Referring to FIG. 9, with further reference to FIGS. 1-8, a method 900 for inhibiting jammed signal use includes the stages shown. The method 900 is, however, an example only and not limiting. The method 900 may be altered, e.g., by having stages added, removed, rearranged, combined, performed concurrently, and/or having single stages split into multiple stages. Examples are provided below for receiving L1 and L5 signals, but the disclosure is not limited to these frequency bands and is not limited to receiving (or measuring) satellite signals (also called SV signals). Further, while the discussion of the method 900 focuses on detection of jamming of signals for positioning, the method 900 is applicable to other types of signals (e.g., communication signals).

At stage 910, the method 900 includes receiving a desired signal wirelessly at a receiver. For example, the receive chain 860 receives, via the antenna 840, the SV signal 611 from the satellite 190, with the first SV signal having a first frequency, e.g., one or more frequencies in a frequency band, e.g., the L1 band or the L5 band. As another example, the receive chain 860 receives the communication signal 631 from the base station 630. The interface 520, e.g., the receive chain 860, or a portion thereof (e.g., the BPF 861), and the antenna 840 may comprise means for receiving the desired signal. Other components of the receive chain 860 may or may not comprise portions of the means for receiving the desired signal. For example, components downstream of an inactive component may not comprise portions of the means for receiving the first satellite signal.

At stage 920, the method 900 includes receiving an undesired signal wirelessly at the receiver, the undesired signal varying in strength over time. For example, the receive chain 860 receives, via the antenna 640, the jamming signal 641 from the jammer 640, with the undesired signal being in-band (overlapping in frequency with the desired signal) or out-of-band (not overlapping in frequency with the desired signal, but within a frequency band for which the receive chain 860 is designed to receive and process signals). The interface 520, e.g., the receive chain 860, or a portion thereof (e.g., the BPF 861), and the antenna 840 may comprise means for receiving the undesired signal. Similar to the discussion of stage 910, other components of the receive chain 860 may or may not comprise portions of the means for receiving the undesired signal.

At stage 930, the method 900 includes inhibiting measurement of the desired signal, or use of a measurement of the desired signal, based on a determination that the undesired signal is a jamming signal based on a variation of the undesired signal being indicative of jamming. For example, the processor 810 (e.g., the processor 510) may control the receive chain 860 (and/or one or more other receive chains such as the receive chain 870) to be inactive (with at least one component being inactive, e.g., powered OFF (e.g., not receiving power)) such that the received signal is not fully processed by the receive chain 860, preventing the desired signal from being measured. This may reduce power consumption and improve positioning accuracy, or at least help prevent worsening positioning accuracy, by avoiding measuring a jammed signal and avoiding determining position using a measurement of a jammed signal. If the jammed signal is not measured, then the jammed signal is not used for positioning or other desired use (e.g., communication). As another example, the jamming effect mitigation unit 570 may not suppress measurement of the desired signal, but inhibit use of a measurement of the desired signal by deprecating the measurement or invalidating the measurement. The jamming effect mitigation unit 570 may deprecate or invalidate the measurement internally, with one or more internal notices, and/or externally, e.g., by transmitting one or more deprecating/invalidating messages via the interface 520 (e.g., via a transceiver including the antenna 840). This may reduce power consumption and improve positioning accuracy, or at least help prevent worsening positioning accuracy, by avoiding determining position using a measurement of a jammed signal. The processor 510, possibly in combination with the memory 530, possibly in combination with the interface 520 (e.g., the receive chain 860 and/or the receive chain 870, and/or possibly the wireless transmitter 244 and the antenna 246) may comprise means for inhibiting measurement of the desired signal, or use of a measurement of the desired signal.

Implementations of the method 900 may include one or more of the following features. In an example implementation, the method 900 includes: determining a plurality of first values of a signal-strength metric for one or more first signals wirelessly received at the receiver, each of the plurality of first values of the signal-strength metric corresponding to a different time; determining a second value of a variation metric based on the plurality of first values of the signal-strength metric; and determining that the undesired signal is the jamming signal based on the second value of the variation metric indicating that the variation of the undesired signal exceeds a threshold variation. For example, the jamming signal detection unit 560 (e.g., implemented by the processor 510 and possibly the memory 530), may determine the signal-strength metric $S_{metric}$ according to Equation (1). The jamming signal detection unit 560 may determine the value of the variation metric $V_{metric}(N)$ using, for example, any of Equations (2)-(4) or another technique for calculating $V_{metric}(N)$ (e.g., a combination of two or more of Equations (2)-(4)). The jamming signal detection unit 560 may determine that the undesired signal is a jamming signal based on the variation metric in accordance with any of if-then logic (5)-(8) or another technique for determining that the signal metric variation is indicative of a jamming signal. The processor 510, possibly in combination with the memory 530, may comprise means for determining the plurality of first values of the signal-strength metric, means for determining a value of the variation metric, and means for determining that the undesired signal is the jamming signal. In a further example implementation, determining that the undesired signal is the jamming signal is based further on at least one of the plurality of first values of the signal-strength metric exceeding a signal-strength threshold. For example, the jamming signal detection unit 560 may determine that the undesired signal is a jamming signal based on the variation metric in accordance with any of if-then logic (6)-(8) or another technique for determining that the signal metric variation is indicative of a jamming signal and includes the signal-strength metric exceeding a signal-strength threshold. In a further example implementation, determining the signal-strength threshold based on a first expected value of the signal-strength metric for the desired signal in absence of the jamming signal. For example, jamming signal detection unit 560 may determine the signal-strength threshold in accordance with Equation (10) or in accordance with another formula including an RNL value. The processor 510, possibly in combination with the memory 530, may comprise means for determining the signal-strength threshold. In a further example implementation, the signal-strength threshold is a first signal-strength threshold, the desired signal is of a first frequency in a first frequency band, and the method 900 includes: receiving a second signal in a second frequency band that is different from the first frequency band; and determining the first signal-strength threshold based further on a third value of the signal-strength metric for the second signal. For example, the jamming signal detection unit 560 may determine the signal-strength threshold for the first frequency band in accordance with either Equation (11) or Equation (12). The processor 510, possibly in combination with the memory 530, in combination with the interface 520 (e.g., the wireless receiver 244 and the antenna 246) may comprise means for receiving the second signal, and the processor 510, possibly in combination with the memory 530, may comprise means for determining the first signal-strength threshold based on the value of the signal strength metric for the second signal. In a further example implementation, the jamming signal is a first jamming signal in the first frequency band, and determining the first signal-strength threshold is based further on a difference between the second value of the signal-strength metric for the second signal and a second expected value of the signal-strength metric for the second signal absent a second jamming signal in the second frequency band. For example, the jamming signal detection unit 560 may determine the signal-strength threshold for the first frequency band in accordance with Equation (12). In another example implementation, the method 900 includes determining the first expected value of the signal-strength metric dynamically. For example, the jamming signal detection unit 560 may determine the RNL dynamically by setting and/or adjusting an RNL value based on one or more signal measurements determined in an on-going manner. The processor 510, possibly in combination with the memory 530, possibly in combination with the interface 520 (e.g., the antenna 840 and the receive chain 860) may comprise means for determining the first expected value of the signal-strength metric. In a further example implementation, determining the first expected value of the signal-strength metric comprises determining a present value of the first expected value of the signal-strength metric based on a previous value of the first expected value of the signal-strength metric and a difference between one of the plurality of first values of the signal-strength metric and the previous value of the first expected value of the signal-strength metric. For example, the jamming signal detection unit may calculate the $RNL_{new}$ value in accordance with Equation (13), or in accordance with if-then-else logic (14) or if-then-else logic (15). In a further example, implementation, the method 900 includes adjusting the previous value of the first expected value of the signal-strength metric, to determine the present value of the first expected value of the signal-strength metric, by a greater amount if the one of the plurality of first values of the signal-strength metric exceeds the previous value of the first expected value of the signal-strength metric than if the one of the plurality of first values of the signal-strength metric is less than the previous value of the first expected value of the signal-strength metric. For example, the jamming signal detection unit may calculate the RNL new value in accordance with if-then-else logic (14) or if-then-else logic (15). In another example implementation, determining the first expected value of the signal-strength metric comprises changing a previous value of the first expected value of the signal-strength metric by a greater amount to determine a present value of the first expected value of the signal-strength metric in absence of out-of-band jamming than in presence of the out-of-band jamming. For example, the jamming signal detection unit may calculate the $RNL_{new}$ value in accordance with if-then-else logic (15).

Also or alternatively, implementations of the method 900 may include one or more of the following features. In an example implementation, the desired signal is a first desired signal of a first frequency in a first frequency band, and the method 900 includes enabling measurement, by the receiver, of a second desired signal of a second frequency in a second frequency band that is different from the first frequency band. For example, the jamming effect mitigation unit 570 may inactivate one or more components of the receive chain 860 and activate the receive chain 870 (e.g., if the receive chain 870 is not jammed) to allow accurate measurement of a signal that is not jammed while another signal in another frequency band is jammed. This may help improve positioning accuracy in the presence of jamming by avoiding measuring, or using a measurement of, a jammed signal while measuring and using a measurement of a non-jammed signal.

Implementation Examples

Implementation examples are provided in the following numbered clauses.

Clause 1. An apparatus comprising:
a receiver configured to receive one or more signals wirelessly;
a memory; and
a processor communicatively coupled to the receiver and the memory and configured to:
receive, via the receiver, a desired signal;
receive, via the receiver, an undesired signal that varies in strength over time; and
inhibit measurement of the desired signal, or use of a measurement of the desired signal, based on a determination that the undesired signal is a jamming signal based on a variation of the undesired signal being indicative of jamming.

Clause 2. The apparatus of clause 1, wherein the processor is further configured to:
determine a plurality of first values of a signal-strength metric for one or more first signals received via the receiver, each of the plurality of first values of the signal-strength metric corresponding to a different time;
determine a second value of a variation metric based on the plurality of first values of the signal-strength metric; and
determine that the undesired signal is the jamming signal based on the second value of the variation metric indicating that the variation of the undesired signal exceeds a threshold variation.

Clause 3. The apparatus of clause 2, wherein the processor is further configured to determine that the undesired signal is the jamming signal based further on at least one of the plurality of first values of the signal-strength metric exceeding a signal-strength threshold.

Clause 4. The apparatus of clause 3, wherein the processor is further configured to determine the signal-strength threshold based on a first expected value of the signal-strength metric for the desired signal in absence of the jamming signal.

Clause 5. The apparatus of clause 4, wherein:
the signal-strength threshold is a first signal-strength threshold;
the desired signal is of a first frequency in a first frequency band;
the receiver is configured to receive a second signal, via the receiver, in a second frequency band that is different from the first frequency band; and
the processor is further configured to determine the first signal-strength threshold based further on a third value of the signal-strength metric for the second signal.

Clause 6. The apparatus of clause 5, wherein the jamming signal is a first jamming signal in the first frequency band, and wherein the processor is further configured to determine the first signal-strength threshold based further on a difference between the second value of the signal-strength metric for the second signal and a second expected value of the signal-strength metric for the second signal absent a second jamming signal in the second frequency band.

Clause 7. The apparatus of clause 4, wherein the processor is further configured to determine the first expected value of the signal-strength metric dynamically.

Clause 8. The apparatus of clause 7, wherein to determine the first expected value of the signal-strength metric the processor is further configured to determine a present value of the first expected value of the signal-strength metric based on a previous value of the first expected value of the signal-strength metric and a difference between one of the plurality of first values of the signal-strength metric and the previous value of the first expected value of the signal-strength metric.

Clause 9. The apparatus of clause 8, wherein the processor is further configured to adjust the previous value of the first expected value of the signal-strength metric, to determine the present value of the first expected value of the signal-strength metric, by a greater amount if the one of the plurality of first values of the signal-strength metric exceeds the previous value of the first expected value of the signal-strength metric than if the one of the plurality of first values of the signal-strength metric is less than the previous value of the first expected value of the signal-strength metric.

Clause 10. The apparatus of clause 7, wherein to determine the first expected value of the signal-strength metric the processor is further configured to change a previous value of the first expected value of the signal-strength metric by a greater amount to determine a present value of the first expected value of the signal-strength metric in absence of out-of-band jamming than in presence of the out-of-band jamming.

Clause 11. The apparatus of clause 1, wherein the desired signal is a first desired signal of a first frequency in a first frequency band, and the processor is further configured to enable measurement, by the apparatus, of a second desired signal of a second frequency in a second frequency band that is different from the first frequency band.

Clause 12. A method for inhibiting jammed signal use, the method comprising:
receiving a desired signal wirelessly at a receiver;
receiving an undesired signal wirelessly at the receiver, the undesired signal varying in strength over time; and
inhibiting measurement of the desired signal, or use of a measurement of the desired signal, based on a determination that the undesired signal is a jamming signal based on a variation of the undesired signal being indicative of jamming.

Clause 13. The method for inhibiting jammed signal use of clause 12, further comprising:
determining a plurality of first values of a signal-strength metric for one or more first signals wirelessly received at the receiver, each of the plurality of first values of the signal-strength metric corresponding to a different time;
determining a second value of a variation metric based on the plurality of first values of the signal-strength metric; and
determining that the undesired signal is the jamming signal based on the second value of the variation metric indicating that the variation of the undesired signal exceeds a threshold variation.

Clause 14. The method for inhibiting jammed signal use of clause 13, wherein determining that the undesired signal is the jamming signal is based further on at least one of the plurality of first values of the signal-strength metric exceeding a signal-strength threshold.

Clause 15. The method for inhibiting jammed signal use of clause 14, further comprising determining the signal-strength threshold based on a first expected value of the signal-strength metric for the desired signal in absence of the jamming signal.

Clause 16. The method for inhibiting jammed signal use of clause 15, wherein:
the signal-strength threshold is a first signal-strength threshold;
the desired signal is of a first frequency in a first frequency band; and
the method for inhibiting jammed signal use further comprises:
receiving a second signal in a second frequency band that is different from the first frequency band; and
determining the first signal-strength threshold based further on a third value of the signal-strength metric for the second signal.

Clause 17. The method for inhibiting jammed signal use of clause 16, wherein the jamming signal is a first jamming signal in the first frequency band, and wherein determining the first signal-strength threshold is based further on a difference between the second value of the signal-strength metric for the second signal and a second expected value of the signal-strength metric for the second signal absent a second jamming signal in the second frequency band.

Clause 18. The method for inhibiting jammed signal use of clause 15, further comprising determining the first expected value of the signal-strength metric dynamically.

Clause 19. The method for inhibiting jammed signal use of clause 18, wherein determining the first expected value of the signal-strength metric comprises determining a present value of the first expected value of the signal-strength metric based on a previous value of the first expected value of the signal-strength metric and a difference between one of the plurality of first values of the signal-strength metric and the previous value of the first expected value of the signal-strength metric.

Clause 20. The method for inhibiting jammed signal use of clause 19, further comprising adjusting the previous value of the first expected value of the signal-strength metric, to determine the present value of the first expected value of the signal-strength metric, by a greater amount if the one of the plurality of first values of the signal-strength metric exceeds the previous value of the first expected value of the signal-strength metric than if the one of the plurality of first values of the signal-strength metric is less than the previous value of the first expected value of the signal-strength metric.

Clause 21. The method for inhibiting jammed signal use of clause 18, wherein determining the first expected value of the signal-strength metric comprises changing a previous value of the first expected value of the signal-strength metric by a greater amount to determine a present value of the first expected value of the signal-strength metric in absence of out-of-band jamming than in presence of the out-of-band jamming.

Clause 22. The method for inhibiting jammed signal use of clause 12, wherein the desired signal is a first desired signal of a first frequency in a first frequency band, and the method for inhibiting jammed signal use further comprises enabling measurement, by the receiver, of a second desired signal of a second frequency in a second frequency band that is different from the first frequency band.

Clause 23. An apparatus comprising:
means for receiving a desired signal wirelessly;
means for receiving an undesired signal wirelessly, the undesired signal varying in strength over time; and
means for inhibiting measurement of the desired signal, or use of a measurement of the desired signal, based on a determination that the undesired signal is a jamming signal based on a variation of the undesired signal being indicative of jamming.

Clause 24. The apparatus of clause 23, further comprising:
means for determining a plurality of first values of a signal-strength metric for one or more first signals wirelessly received at the apparatus, each of the plurality of first values of the signal-strength metric corresponding to a different time;
means for determining a second value of a variation metric based on the plurality of first values of the signal-strength metric; and
means for determining that the undesired signal is the jamming signal based on the second value of the variation metric indicating that the variation of the undesired signal exceeds a threshold variation.

Clause 25. The apparatus of clause 24, wherein the means for determining that the undesired signal is the jamming signal comprise means for determining that the undesired signal is the jamming signal based further on at least one of the plurality of first values of the signal-strength metric exceeding a signal-strength threshold.

Clause 26. The apparatus of clause 25, further comprising means for determining the signal-strength threshold based on a first expected value of the signal-strength metric for the desired signal in absence of the jamming signal.

Clause 27. The apparatus of clause 26, wherein:
the signal-strength threshold is a first signal-strength threshold;
the desired signal is of a first frequency in a first frequency band; and
the apparatus further comprises:
means for receiving a second signal in a second frequency band that is different from the first frequency band; and
means for determining the first signal-strength threshold based further on a third value of the signal-strength metric for the second signal.

Clause 28. The apparatus of clause 27, wherein the jamming signal is a first jamming signal in the first frequency band, and wherein the means for determining the first signal-strength threshold comprise means for determining the first signal-strength threshold based further on a difference between the second value of the signal-strength metric for the second signal and a second expected value of the signal-strength metric for the second signal absent a second jamming signal in the second frequency band.

Clause 29. The apparatus of clause 26, further comprising means for determining the first expected value of the signal-strength metric dynamically.

Clause 30. The apparatus of clause 29, wherein the means for determining the first expected value of the signal-strength metric comprise means for determining a present value of the first expected value of the signal-strength metric based on a previous value of the first expected value of the signal-strength metric and a difference between one of the plurality of first values of the signal-strength metric and the previous value of the first expected value of the signal-strength metric.

Clause 31. The apparatus of clause 30, further comprising means for adjusting the previous value of the first expected value of the signal-strength metric, to determine the present value of the first expected value of the signal-strength metric, by a greater amount if the one of the plurality of first values of the signal-strength metric exceeds the previous value of the first expected value of the signal-strength metric than if the one of the plurality of first values of the signal-strength metric is less than the previous value of the first expected value of the signal-strength metric.

Clause 32. The apparatus of clause 29, wherein the means for determining the first expected value of the signal-strength metric comprise means for changing a previous value of the first expected value of the signal-strength metric by a greater amount to determine a present value of the first expected value of the signal-strength metric in absence of out-of-band jamming than in presence of the out-of-band jamming.

Clause 33. The apparatus of clause 23, wherein the desired signal is a first desired signal of a first frequency in a first frequency band, and the apparatus further comprises means for enabling measurement, by the apparatus, of a second desired signal of a second frequency in a second frequency band that is different from the first frequency band.

Clause 34. A non-transitory, processor-readable storage medium comprising processor-readable instructions to cause a processor of an apparatus to:
receive a desired signal wirelessly;
receive an undesired signal wirelessly, the undesired signal varying in strength over time; and
inhibit measurement of the desired signal, or use of a measurement of the desired signal, based on a determination that the undesired signal is a jamming signal based on a variation of the undesired signal being indicative of jamming.

Clause 35. The storage medium of clause 34, further comprising processor-readable instructions to cause the processor to:
determine a plurality of first values of a signal-strength metric for one or more first signals wirelessly received at the apparatus, each of the plurality of first values of the signal-strength metric corresponding to a different time;
determine a second value of a variation metric based on the plurality of first values of the signal-strength metric; and
determine that the undesired signal is the jamming signal based on the second value of the variation metric indicating that the variation of the undesired signal exceeds a threshold variation.

Clause 36. The storage medium of clause 35, wherein the processor-readable instructions to cause the processor to determine that the undesired signal is the jamming signal comprise processor-readable instructions to cause the processor to determine that the undesired signal is the jamming signal based further on at least one of the plurality of first values of the signal-strength metric exceeding a signal-strength threshold.

Clause 37. The storage medium of clause 36, further comprising processor-readable instructions to cause the processor to determine the signal-strength threshold based on a first expected value of the signal-strength metric for the desired signal in absence of the jamming signal.

Clause 38. The storage medium of clause 37, wherein:
the signal-strength threshold is a first signal-strength threshold;
the desired signal is of a first frequency in a first frequency band; and the storage medium further comprises processor-readable instructions to cause the processor to:
receive a second signal in a second frequency band that is different from the first frequency band; and
determine the first signal-strength threshold based further on a third value of the signal-strength metric for the second signal.

Clause 39. The storage medium of clause 38, wherein the jamming signal is a first jamming signal in the first frequency band, and wherein the processor-readable instructions to cause the processor to determine the first signal-strength threshold comprise processor-readable instructions to cause the processor to determine the first signal-strength threshold based further on a difference between the second value of the signal-strength metric for the second signal and a second expected value of the signal-strength metric for the second signal absent a second jamming signal in the second frequency band.

Clause 40. The storage medium of clause 37, further comprising processor-readable instructions to cause the processor to determine the first expected value of the signal-strength metric dynamically.

Clause 41. The storage medium of clause 40, wherein the processor-readable instructions to cause the processor to determine the first expected value of the signal-strength metric comprise processor-readable instructions to cause the processor to determine a present value of the first expected value of the signal-strength metric based on a previous value of the first expected value of the signal-strength metric and a difference between one of the plurality of first values of the signal-strength metric and the previous value of the first expected value of the signal-strength metric.

Clause 42. The storage medium of clause 41, further comprising processor-readable instructions to cause the processor to adjust the previous value of the first expected value of the signal-strength metric, to determine the present value of the first expected value of the signal-strength metric, by a greater amount if the one of the plurality of first values of the signal-strength metric exceeds the previous value of the first expected value of the signal-strength metric than if the one of the plurality of first values of the signal-strength metric is less than the previous value of the first expected value of the signal-strength metric.

Clause 43. The storage medium of clause 40, wherein the processor-readable instructions to cause the processor to determine the first expected value of the signal-strength metric comprise processor-readable instructions to cause the processor to change a previous value of the first expected value of the signal-strength metric by a greater amount to determine a present value of the first expected value of the signal-strength metric in absence of out-of-band jamming than in presence of the out-of-band jamming.

Clause 44. The storage medium of clause 34, wherein the desired signal is a first desired signal of a first frequency in a first frequency band, and the storage medium further comprises processor-readable instructions to cause the processor to enable measurement, by the apparatus, of a second desired signal of a second frequency in a second frequency band that is different from the first frequency band.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. An apparatus comprising:
a receiver configured to receive one or more signals wirelessly;
a memory; and
a processor communicatively coupled to the receiver and the memory and configured to:
receive, via the receiver, a desired signal;
receive, via the receiver, an undesired signal that varies in strength over time; and
inhibit measurement of the desired signal, or use of a measurement of the desired signal, based on a determination that the undesired signal is a jamming signal based on a variation of the undesired signal being indicative of jamming.

2. The apparatus of claim 1, wherein the processor is further configured to:
determine a plurality of first values of a signal-strength metric for one or more first signals received via the receiver, each of the plurality of first values of the signal-strength metric corresponding to a different time;
determine a second value of a variation metric based on the plurality of first values of the signal-strength metric; and
determine that the undesired signal is the jamming signal based on the second value of the variation metric indicating that the variation of the undesired signal exceeds a threshold variation.

3. The apparatus of claim 2, wherein the processor is further configured to determine that the undesired signal is the jamming signal based further on at least one of the plurality of first values of the signal-strength metric exceeding a signal-strength threshold.

4. The apparatus of claim 3, wherein the processor is further configured to determine the signal-strength threshold based on a first expected value of the signal-strength metric for the desired signal in absence of the jamming signal.

5. The apparatus of claim 4, wherein:
the signal-strength threshold is a first signal-strength threshold;
the desired signal is of a first frequency in a first frequency band;
the receiver is configured to receive a second signal, via the receiver, in a second frequency band that is different from the first frequency band; and
the processor is further configured to determine the first signal-strength threshold based further on a third value of the signal-strength metric for the second signal.

6. The apparatus of claim 5, wherein the jamming signal is a first jamming signal in the first frequency band, and wherein the processor is further configured to determine the first signal-strength threshold based further on a difference between the second value of the signal-strength metric for the second signal and a second expected value of the signal-strength metric for the second signal absent a second jamming signal in the second frequency band.

7. The apparatus of claim 4, wherein the processor is further configured to determine the first expected value of the signal-strength metric dynamically.

8. The apparatus of claim 7, wherein to determine the first expected value of the signal-strength metric the processor is further configured to determine a present value of the first expected value of the signal-strength metric based on a previous value of the first expected value of the signal-strength metric and a difference between one of the plurality of first values of the signal-strength metric and the previous value of the first expected value of the signal-strength metric.

9. The apparatus of claim 8, wherein the processor is further configured to adjust the previous value of the first expected value of the signal-strength metric, to determine the present value of the first expected value of the signal-strength metric, by a greater amount if the one of the plurality of first values of the signal-strength metric exceeds the previous value of the first expected value of the signal-strength metric than if the one of the plurality of first values of the signal-strength metric is less than the previous value of the first expected value of the signal-strength metric.

10. The apparatus of claim 7, wherein to determine the first expected value of the signal-strength metric the processor is further configured to change a previous value of the first expected value of the signal-strength metric by a greater amount to determine a present value of the first expected value of the signal-strength metric in absence of out-of-band jamming than in presence of the out-of-band jamming.

11. The apparatus of claim 1, wherein the desired signal is a first desired signal of a first frequency in a first frequency band, and the processor is further configured to enable measurement, by the apparatus, of a second desired signal of a second frequency in a second frequency band that is different from the first frequency band.

12. A method for inhibiting jammed signal use, the method comprising:
receiving a desired signal wirelessly at a receiver;
receiving an undesired signal wirelessly at the receiver, the undesired signal varying in strength over time; and
inhibiting measurement of the desired signal, or use of a measurement of the desired signal, based on a determination that the undesired signal is a jamming signal based on a variation of the undesired signal being indicative of jamming.

13. The method for inhibiting jammed signal use of claim 12, further comprising:
determining a plurality of first values of a signal-strength metric for one or more first signals wirelessly received at the receiver, each of the plurality of first values of the signal-strength metric corresponding to a different time;
determining a second value of a variation metric based on the plurality of first values of the signal-strength metric; and
determining that the undesired signal is the jamming signal based on the second value of the variation metric indicating that the variation of the undesired signal exceeds a threshold variation.

14. The method for inhibiting jammed signal use of claim 13, wherein determining that the undesired signal is the jamming signal is based further on at least one of the plurality of first values of the signal-strength metric exceeding a signal-strength threshold.

15. The method for inhibiting jammed signal use of claim 14, further comprising determining the signal-strength threshold based on a first expected value of the signal-strength metric for the desired signal in absence of the jamming signal.

16. The method for inhibiting jammed signal use of claim 15, wherein:
the signal-strength threshold is a first signal-strength threshold;
the desired signal is of a first frequency in a first frequency band; and
the method for inhibiting jammed signal use further comprises:
receiving a second signal in a second frequency band that is different from the first frequency band; and
determining the first signal-strength threshold based further on a third value of the signal-strength metric for the second signal.

17. The method for inhibiting jammed signal use of claim 16, wherein the jamming signal is a first jamming signal in the first frequency band, and wherein determining the first signal-strength threshold is based further on a difference between the second value of the signal-strength metric for the second signal and a second expected value of the signal-strength metric for the second signal absent a second jamming signal in the second frequency band.

18. The method for inhibiting jammed signal use of claim 15, further comprising determining the first expected value of the signal-strength metric dynamically.

19. The method for inhibiting jammed signal use of claim 18, wherein determining the first expected value of the signal-strength metric comprises determining a present value of the first expected value of the signal-strength metric based on a previous value of the first expected value of the signal-strength metric and a difference between one of the plurality of first values of the signal-strength metric and the previous value of the first expected value of the signal-strength metric.

20. The method for inhibiting jammed signal use of claim 19, further comprising adjusting the previous value of the first expected value of the signal-strength metric, to determine the present value of the first expected value of the signal-strength metric, by a greater amount if the one of the plurality of first values of the signal-strength metric exceeds the previous value of the first expected value of the signal-strength metric than if the one of the plurality of first values of the signal-strength metric is less than the previous value of the first expected value of the signal-strength metric.

21. The method for inhibiting jammed signal use of claim 18, wherein determining the first expected value of the signal-strength metric comprises changing a previous value of the first expected value of the signal-strength metric by a greater amount to determine a present value of the first expected value of the signal-strength metric in absence of out-of-band jamming than in presence of the out-of-band jamming.

22. The method for inhibiting jammed signal use of claim 12, wherein the desired signal is a first desired signal of a first frequency in a first frequency band, and the method for inhibiting jammed signal use further comprises enabling measurement, by the receiver, of a second desired signal of a second frequency in a second frequency band that is different from the first frequency band.

23. An apparatus comprising:
means for receiving a desired signal wirelessly;
means for receiving an undesired signal wirelessly, the undesired signal varying in strength over time; and
means for inhibiting measurement of the desired signal, or use of a measurement of the desired signal, based on a determination that the undesired signal is a jamming signal based on a variation of the undesired signal being indicative of jamming.

24. The apparatus of claim 23, further comprising:
- means for determining a plurality of first values of a signal-strength metric for one or more first signals wirelessly received at the apparatus, each of the plurality of first values of the signal-strength metric corresponding to a different time;
- means for determining a second value of a variation metric based on the plurality of first values of the signal-strength metric; and
- means for determining that the undesired signal is the jamming signal based on the second value of the variation metric indicating that the variation of the undesired signal exceeds a threshold variation.

25. The apparatus of claim 24, wherein the means for determining that the undesired signal is the jamming signal comprise means for determining that the undesired signal is the jamming signal based further on at least one of the plurality of first values of the signal-strength metric exceeding a signal-strength threshold.

26. The apparatus of claim 25, further comprising means for determining the signal-strength threshold based on a first expected value of the signal-strength metric for the desired signal in absence of the jamming signal.

27. The apparatus of claim 26, wherein:
- the signal-strength threshold is a first signal-strength threshold;
- the desired signal is of a first frequency in a first frequency band; and
- the apparatus further comprises:
  - means for receiving a second signal in a second frequency band that is different from the first frequency band; and
  - means for determining the first signal-strength threshold based further on a third value of the signal-strength metric for the second signal.

28. The apparatus of claim 27, wherein the jamming signal is a first jamming signal in the first frequency band, and wherein the means for determining the first signal-strength threshold comprise means for determining the first signal-strength threshold based further on a difference between the second value of the signal-strength metric for the second signal and a second expected value of the signal-strength metric for the second signal absent a second jamming signal in the second frequency band.

29. A non-transitory, processor-readable storage medium comprising processor-readable instructions to cause a processor of an apparatus to:
- receive a desired signal wirelessly;
- receive an undesired signal wirelessly, the undesired signal varying in strength over time; and
- inhibit measurement of the desired signal, or use of a measurement of the desired signal, based on a determination that the undesired signal is a jamming signal based on a variation of the undesired signal being indicative of jamming.

30. The storage medium of claim 29, further comprising processor-readable instructions to cause the processor to:
- determine a plurality of first values of a signal-strength metric for one or more first signals wirelessly received at the apparatus, each of the plurality of first values of the signal-strength metric corresponding to a different time;
- determine a second value of a variation metric based on the plurality of first values of the signal-strength metric; and
- determine that the undesired signal is the jamming signal based on the second value of the variation metric indicating that the variation of the undesired signal exceeds a threshold variation.

* * * * *